United States Patent [19]

Dahlin

[11] Patent Number: 5,140,627
[45] Date of Patent: Aug. 18, 1992

[54] HANDOFF PROCEDURE THAT MINIMIZES DISTURBANCES TO DTMF SIGNALLING IN A CELLULAR RADIO SYSTEM

[75] Inventor: Jan E. A. S. Dahlin, Järfälla, Sweden

[73] Assignee: Telefonaktiebolaget L M Ericsson, Stockholm, Sweden

[21] Appl. No.: 594,036

[22] Filed: Oct. 9, 1990

[51] Int. Cl.⁵ .................................. H04M 11/00
[52] U.S. Cl. .................................. 379/60; 379/59
[58] Field of Search .................. 379/59, 60, 63

[56] References Cited

U.S. PATENT DOCUMENTS

| | | | |
|---|---|---|---|
| 4,457,018 | 6/1984 | Takayama | 379/60 |
| 4,475,010 | 10/1984 | Huensch et al. | 379/60 |
| 4,485,486 | 11/1984 | Webb et al. | 379/60 |
| 4,608,711 | 8/1986 | Goldman | 379/60 |
| 4,654,867 | 3/1987 | Labedz et al. | 379/60 |
| 4,669,107 | 5/1987 | Eriksson et al. | 379/60 |
| 4,670,899 | 6/1987 | Brody et al. | 379/60 |
| 4,737,978 | 4/1988 | Burke et al. | 379/60 |
| 4,811,380 | 3/1989 | Spear | 379/60 |
| 4,837,800 | 6/1989 | Freeburg et al. | 379/63 |
| 4,912,756 | 3/1990 | Hop | 379/60 |
| 4,953,197 | 8/1990 | Kaewell, Jr. et al. | 379/63 |
| 4,955,082 | 9/1990 | Hattori et al. | 379/63 |

FOREIGN PATENT DOCUMENTS 0347396  12/1989  European Pat. Off. ............ 379/60

Primary Examiner—James L. Dwyer
Assistant Examiner—Dwayne D. Bost
Attorney, Agent, or Firm—Burns, Doane, Swecker & Mathis

[57] ABSTRACT

Disturbances to DTMF signaling between mobile stations and the land-based system caused by handoff are minimized. DTMF signals are transmitted in real time between a mobile station and its associated base station. However, if during a DTMF transmission between a base station and the mobile switching center a handoff is requested, the handoff is delayed by a specified time in order to allow completion of the DTMF transmission. Alternatively, both base stations involved in the handoff transmit overlapping DTMF tones until the handoff is completed. If the handoff is requested before the start of the DTMF tone transmission, the DTMF transmission is delayed until the handoff is completed.

19 Claims, 14 Drawing Sheets

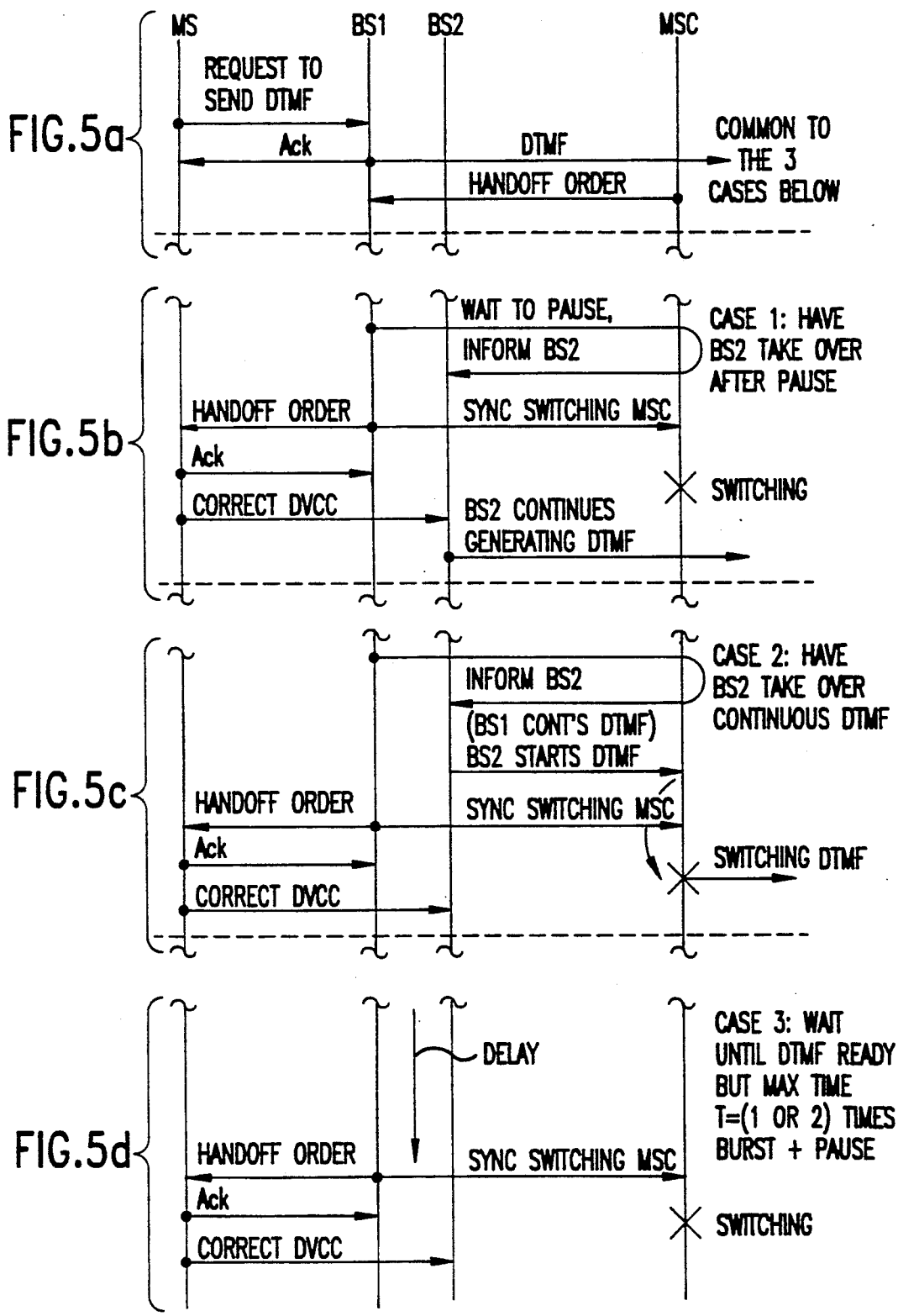

HANDOFF PROCEDURE THAT MINIMIZES DISTURBANCES TO DTMF SIGNALLING IN A CELLULAR RADIO SYSTEM

FIELD OF THE INVENTION

This invention relates to cellular mobile radio systems designed for digital or hybrid (digital and analog) voice/traffic channels. More particularly, the present invention is directed to a method and apparatus for processing handoffs so that disturbances to dual tone multifrequency (DTMF) signaling are minimized.

BACKGROUND OF THE INVENTION

The first cellular mobile radio systems in public use were generally analog systems for the transmission of speech or other analog information. The systems included a plurality of radio channels for transmitting analog information between base and mobile stations by transmitting analog modulated radio signals. In general, the first cellular mobile radio systems had comparably large coverage cells.

More recently, digital cellular mobile radio systems for public use have been designed. Digital cellular mobile radio systems have digital channels for transmitting digital or digitized analog information between base and mobile stations by transmitting digitally modulated radio signals. Digital cellular mobile radio systems offer substantial advantages over analog cellular mobile radio systems.

One digital mobile radio system intended to be used commonly in many European countries is the GSM system. In European countries already having an analog cellular mobile system, the new digital GSM system will be introduced independent of any existing analog system. Thus, the GSM system base and mobile stations are not designed to be compatible with existing analog systems.

Rather than introduce an independent digital cellular mobile radio system, like the GSM system, into an area with an existing analog cellular system, the present invention seeks to introduce a digital cellular mobile radio system designed for cooperation with an existing analog cellular mobile radio system. To obtain digital channels within the frequency band allotted to cellular mobile radio systems, a number of radio channels allotted to the existing analog mobile radio systems could be allocated for use in the digital cellular mobile radio system. One design of the digital mobile radio system allows three or possibly six digital channels to occupy the same frequency band of one previous analog radio channel by using time division multiplexing. Replacing some analog channels with digital channels in time division multiplex increases the total number of radio channels.

The digital cellular system could be introduced by gradually increasing the number of digital channels while decreasing the number of analog channels. Analog mobile stations already in use will continue to use the remaining analog channels. At the same time, digital mobile stations will use the new digital channels. Dual-mode mobile stations will be able to use both the remaining analog channels and the new digital channels.

Both analog and digital cellular systems must be able to generate DTMF (Dual Tone Multiple Frequency) tones. In the analog systems, the DTMF generator is part of the mobile station. The DTMF tones are generated in the mobile station and transferred as audio information over the radio channel through the cellular system to the other party of the call connection. That other party usually is a subscriber from the public switched telephone network (PSTN). DTMF tones may also be generated by the PSTN subscriber and detected in the mobile station.

The GSM digital system requires separate hardware components to generate DTMF tones. The present invention seeks to avoid adding hardware for DTMF tone generation by utilizing the existing the speech coder/decoder hardware to accomplish the generation and decoding of DTMF tones. As a result of coding DTMF tones into digital format, digital data messages rather than audio tones must be transferred to and from the mobile station. Consequently, the generation and detection of the DTMF tones are performed at the base station instead of the mobile station.

In cellular systems in the United States, the Electronic Industries Association specification standards EIT/TIA-IS-54 require DTMF tones to be transmittable in two modes: burst DTMF and continuous DTMF. In the burst DTMF mode, when a mobile station user dials, e.g., by depressing a push-button key, the dialed digit/symbol, e.g., corresponding to the depressed key, is stored in the mobile station. After dialing, so that a sequence of digits/symbols have been entered and stored at the mobile station, the mobile user may initiate the transmission of the dialed sequence of digits/symbols, e.g., by depressing a send key. The mobile station transmits a message including the sequence of digits/symbols. In response to receiving this message, the land-based system generates a DTMF pulse sequence including a pulse for each dialed digit/symbol separated from adjacent pulses by pulse pauses. The DTMF pulses have a uniform width, e.g., 95 msec, as have the pulse pauses, e.g., 60 msec.

In the continuous DTMF mode, a data message is initiated at the beginning and at the end of each dialing of a digit/symbol, e.g., at the depression and at the release of a key. In response to receiving such a data message, the land-based system starts and stops the generation of DTMF tones, respectively. In the continuous mode, a DTMF signal is not generated automatically for a fixed time, but continues for the time of actuation/depression of a key. Thus, in the continuous mode, the duration of the DTMF transmission is variable.

A problem arises in handoff situations where a handoff is to be accomplished during a DTMF transmission. In other words, a handoff order or request occurs immediately after an entry of a number/symbol sequence on a mobile radio or telephone handset but before the transmission of the DTMF tones corresponding to the number/symbol sequence is terminated. Specifically, the problem arises in switching the transmission links in the land-based system between the two base stations involved in a handoff, e.g., the serving base station and the target base station and the mobile service switching center(s) to which the base stations are connected at the same time DTMF tones are being transmitted from the responsible base station towards the other party. Although more than one mobile switching center may be involved in handoff situations, only one mobile switching center is illustrated for purposes of simplifying discussion.

A simple example illustrates the problem of coincidental occurrence of handoff and DTMF transmissions.

When a DTMF message is sent from a mobile station to a base station, a maximum of 63 binary digits can be accommodated in a single message. Once the 63 DTMF digits are received in the associated base station and translated into the appropriate DTMF format, the translated DTMF tones are transmitted to the other party. This transmission may take up to about 10 seconds based on the fact that each digit/symbol and corresponding pause takes $95+60=155$ msec per digit. If these are 63 digits in a message, the total time ($63 \times 155$ msec) is approximately 10 seconds. If a handoff occurs during these 10 seconds, the DTMF transmission is easily disrupted. A similar situation arises in the continuous DTMF mode or when DTMF tones are sent from the PSTN via the mobile switching center MSC to a base station BS.

Prior U.S. Pat. No. 4,654,867 to Labedz et al discloses a cellular telephone system that halts data transmission on a first radio channel prior to a handoff. When handoff is complete, the data transmission resumes on a second radio channel. However, the Labedz system is not suited to handle the specific situation addressed in the present invention. The problem that is not addressed in Labedz and that is resolved by the present invention is the situation where the base station is transmitting a series of DTMF tones to the other party and a handoff is ordered during this transmission. Since the DTMF transmission from the base station BS to the other party may require up to 10 seconds, the interruption of that DTMF signal transmission for a handoff may introduce errors in that DTMF transmission.

The present invention resolves these problems by minimizing these handoff-related errors in the DTMF transmission.

SUMMARY OF THE INVENTION

Disturbances to DTMF signaling between mobile stations and the land-based system caused by handoff are minimized. DTMF signals are transmitted in real time between a mobile station and its associated base station. However, if during a DTMF transmission between a base station and the mobile switching center a handoff is requested, the handoff is delayed by a specified time in order to allow completion of the DTMF transmission. Alternatively, both base stations involved in the handoff transmit overlapping DTMF tones until the handoff is completed. If the handoff is requested before the start of the DTMF tone transmission, the DTMF transmission is delayed until the handoff is completed.

BRIEF DESCRIPTION OF THE DRAWINGS

FIGS. 5a-5d illustrate a signalling sequence diagram for a handoff during DTMF transmission from a base station to a mobile switching center MSC;

DETAILED DESCRIPTION OF PREFERRED EMBODIMENTS

In the following description of preferred can be used to implement the present invention will be described with reference to FIGS. 1-3. It will be appreciated, however, that specific applications of the invention are not limited to this particular cellular system. Rather, the present invention may be applied to any mobile radio telephone system.

Figure 1:
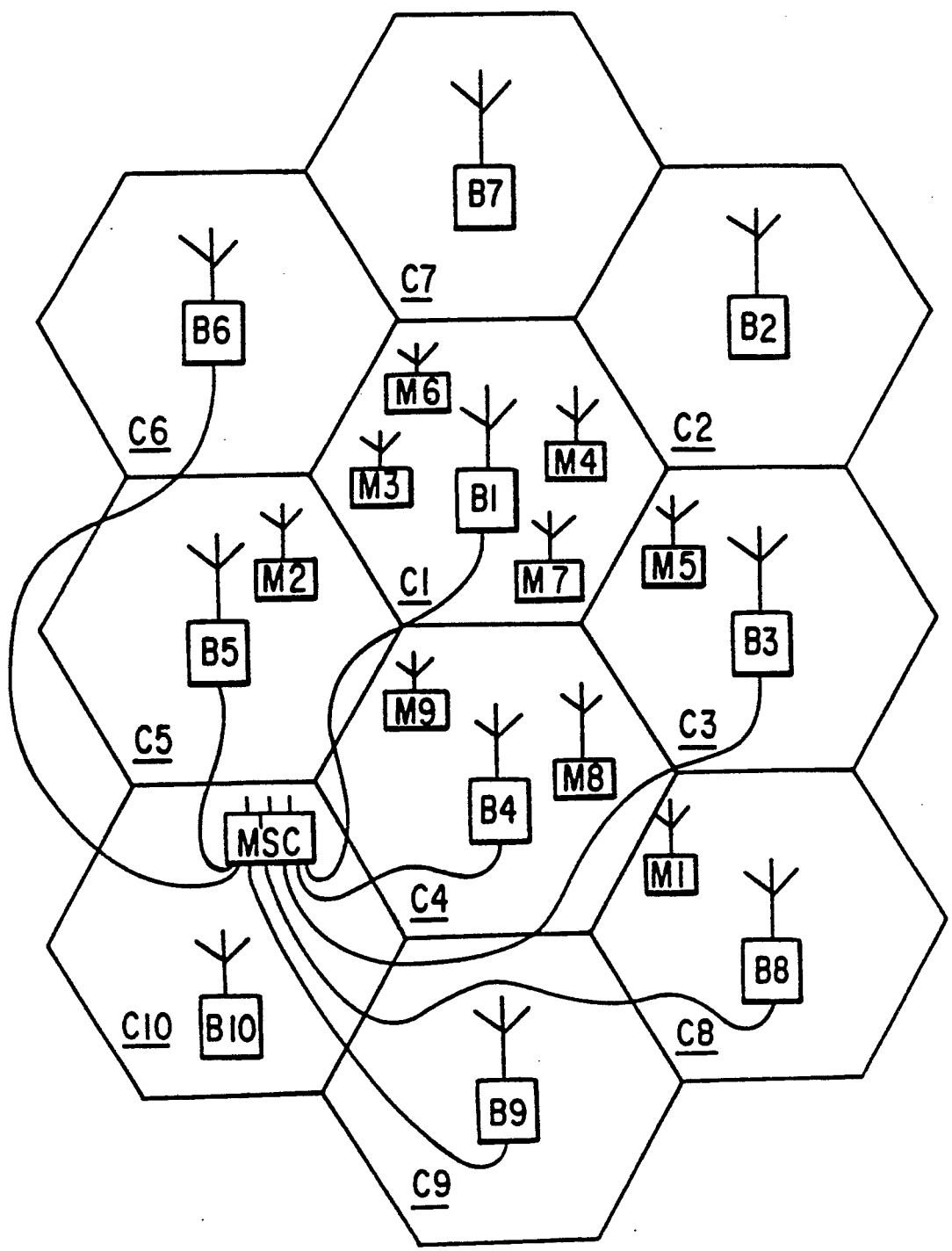
FIG. 1 illustrates a partial cellular layout for a mobile radio telephone system according to the present invention.

FIG. 1 illustrates ten cells C1 to C10 in a cellular mobile radio system. In actual practice, the method and means according to the present invention are implemented in a cellular mobile radio telephone system comprising many more cells than ten. However, ten cells are illustrated for the purpose of explaining the present invention.

For each of these cells C1 through C10 there is a base station B1 through B10, respectively, with the same number as the cell. FIG. 1 illustrates base stations situated in the vicinity of the center of the cell and having omni-directional antennas. However, the base stations of adjacent cells may be allocated in the vicinity of cell borders and have directional antennas as is well known to those of ordinary skill in the art.

FIG. 1 also illustrates ten mobile stations M1 through M10 which are movable within a cell and from one cell to another cell. In actual practice, the method and means according to the present invention are implemented in a cellular mobile radio system comprising many more mobile stations than ten. In particular, there are usually many more mobile stations than there are base stations. However, ten mobile stations are illustrated for purposes of explaining the present invention.

The system of FIG. 1 also includes a mobile switching center MSC. The mobile switching center is connected to all ten illustrated base stations by cables. The mobile switching center is also connected, by cables, to a fixed public switching telephone network PSTN or similar fixed network with ISDN facilities. All cables from the mobile switching center to the base stations and cables to the fixed network are not illustrated.

In addition to the mobile switching center illustrated, there may also be another mobile switching center connected by cables to other base stations than those illustrated in FIG. 1. Instead of cables, other means may be utilized for base to mobile switching center communication, e.g., fixed radio links.

The cellular mobile radio system illustrated in FIG. 1 includes a plurality of radio channels for communication. The system is designed both for analog information such as speech, digitized analog information, digitized speech, and pure digital information. In such a system, the term connection is used for a communication channel established between a mobile station and another mobile station in the same system or another system, or a fixed telephone or terminal in a fixed network connected to the cellular mobile radio system. Thus, a connection may be defined as a call where two persons are able to talk to each other, but also may refer to a data communication channel where computers are exchanging data.

Figure 2:
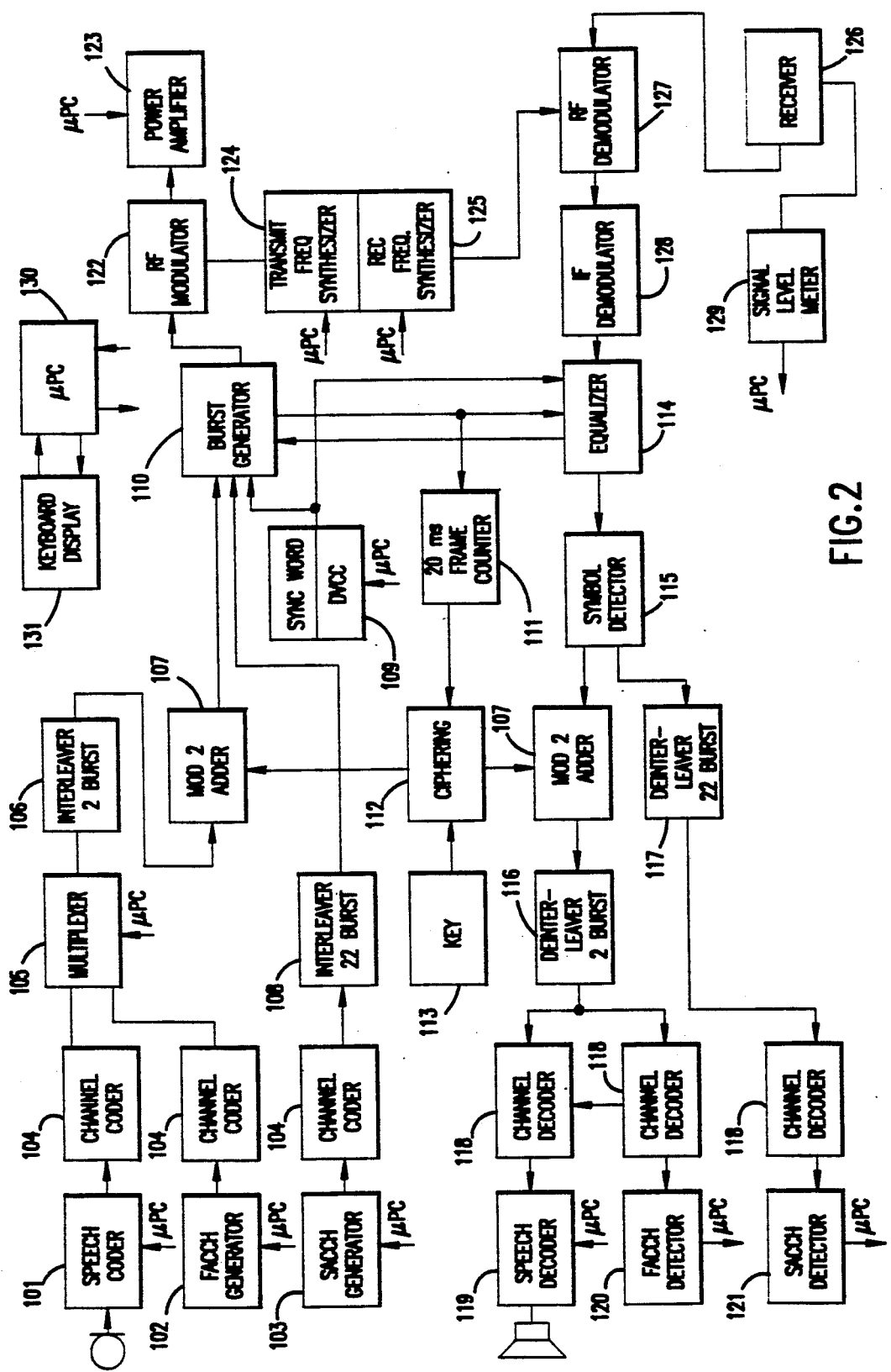
FIG. 2 is a function block diagram of a mobile station for implementing the present invention.

Referring now to FIG. 2, a mobile station that is capable of operating in accordance with the present invention is illustrated. A speech coder 101 is provided for converting the analog signal generated by a microphone into a bit data stream. The bit data stream is then divided into data packages, according to the well-known TDMA (time division multiple access) principle. A fast associated control channel (FACCH) generator 102 generates control and supervision signalling messages between the land-based system and the mobile station. The FACCH message replaces a user frame (speech/data) whenever it is to be transmitted. A slow associated control channel (SACCH) generator 103 provides a continuous channel for the exchange of signalling messages between the base station and the mobile station and vice-versa. A fixed number of bits, e.g., twelve, is allocated to the SACCH for each time slot of the message train. Channel coders 104 can include respectively connected to the speech coder 101, FACCH generator 102, and SACCH generator 103 for manipulating the incoming data in order to carry out error detection and correction. The techniques used by the channel coders 104 are convolutional encoding, which protects important data bits in the speech code, and cyclic redundancy check (CRC), wherein the perceptually significant bits in the speech coder frame, e.g., twelve bits, are used for computing a seven bit check.

A multiplexer or switch 105 is connected to the channel coders 104 associated with the speech coder 101 and the FACCH generator 102, respectively. The multiplexer 105 interchanges user information over a particular speech channel with system supervision messages over the FACCH. A two-burst interleaver 106 is coupled to t he output of the multiplexer 105. Data transmitted by the mobile station is interleaved over two distinct time slots. For example, 260 data bits, which constitute one transmitted word, are divided into two equal parts and are allotted two consecutive time slots. The effects of RAYLEIGH fading are reduced in this manner. The output of the two-burst interleaver 106 is provided to the input of a modulo-two-adder 107 so that the transmitted data is ciphered bit by bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots, each consisting of 12 bits of information.

The mobile station further includes a sync word/DVCC generator 109 for providing the appropriate synchronization word and DVCC associated with the mobile station. The synchronization word is a 28 bit word used for time slot synchronization and identification. Plural, different slot identifiers are defined, one for each time slot. The DVCC (digital verification color code) is an 8-bit code sent by the base station to the mobile station and vice-versa to insure that the proper digital channel is identified and decoded.

A burst generator 110 generates message bursts for transmission by the mobile station. The burst generator 110 is connected to the output signals of the modulo-two-adder 107, the 22-burst interleaver 108, the sync word/DVCC generator 109, and an equalizer 114. A message burst comprising data (260 bits), SACCH (12 bits), sync word (28 bits), coded DVCC (12 bits), and 12 delimiter bits, combine for a total of 324 bits which are integrated according to the time slot format specified by the standard EIA/TIA IS-54. The transmission of a burst, equivalent to one time slot, is synchronized with the transmission of two other time slots making up a three-slot frame and adjusted according to the timing provided by the equalizer 114. Due to time dispersion, an adaptive equalization method is provided in order to improve signal quality. A correlator adjusts to the timing of the received bit stream. The base station is the master and the mobile station is the slave with respect to frame timing. The equalizer 114 detects the incoming timing and synchronizes the burst generator 110. The equalizer 114 also checks the sync word and DVCC for identification purposes.

A 20 ms frame counter 111 is coupled between the burst generator 110 and the equalizer 114. The frame counter 111 updates a ciphering code utilized by the mobile station every 20 ms, once for every transmitted frame. A ciphering unit 112 generates the ciphering code used by the mobile station. Preferably, a pseudo-random algorithm is utilized. The ciphering unit 112 is controlled by a key 113 unique for each subscriber. The ciphering unit 112 consists of a sequencer which updates the ciphering code.

The burst produced by the burst generator 110 is forwarded to an RF modulator 122. The RF modulator 122 modulates a carrier frequency according to the $\pi/4$-DQPSK method ($\pi/4$ shifted, Differentially encoded Quadrature Phase Shift Keying). The use of this technique implies that the information is differentially encoded, i.e., 2 bit symbols are transmitted as four possible changes in phase; $\pm \pi/4$ and $\pm 3\pi/4$. The transmitter carrier frequency supplied to the RF modulator 122 is generated by a transmitting frequency synthesizer 124 in accordance with the selected transmitting channel. Before the carrier frequency is transmitted by an antenna, the carrier is amplified by a power amplifier 123. The RF power emission level of the carrier frequency is selected on command by a microprocessor controller 130.

A receiver carrier frequency is generated in accordance with the selected receiving channel by a receiving frequency synthesizer 125. Incoming radio frequency signals are received by a receiver 126, the strength of which are measured by a signal level meter 129. The received signal strength value is sent to the microprocessor controller 130. An RF demodulator 127 receives the receiver carrier frequency from the receiving frequency synthesizer 125 and the radio frequency signal from the receiver 126 and demodulates the radio frequency carrier signal in order to generate an intermediate frequency (IF). The intermediate frequency signal is demodulated by an IF demodulator 128 to restore the original $\pi/4$-DQPSK - modulated digital information.

The restored digital information provided by IF demodulator 128 is supplied to the equalizer 114. A symbol detector 115 converts the received two bit symbol format of the digital data from the equalizer 114 to a single bit data stream. The symbol detector 115 in turn produces two distinct outputs. Any speech data/FACCH data are supplied to a modulo-two-adder 107 and a two-burst deinterleaver 116. The adder 107 and deinterleaver 116 reconstruct the speech data/FACCH data by assembling and rearranging information from two consecutive frames of the received data. The symbol detector 115 supplies SACCH data to a 22-burst deinterleaver 117. The 22-burst deinterleaver 117 reassembles and rearranges the SACCH data spread over 22 consecutive frames.

The two-burst deinterleaver 116 provides the speech data/FACCH data to two channel decoders 118. The convolutionally encoded data is decoded using the reversed principle of coding. The received cyclic redundancy check (CRC) bits are checked for errors. The FACCH channel coder furthermore detects the distinction between the speech channel and any FACCH information and directs the decoders accordingly. A speech decoder 119 processes the received speech data from the channel decoder 118 in accordance with a speech coder algorithm and generates the received speech signal. The analog signal is finally enhanced by a filtering technique. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by the SACCH detector 121, and the information is transferred to the microprocessor controller 130.

The microprocessor controller 130 controls the mobile station activity and the base station communication, and also handles the terminal keyboard input and display output 131. Decisions by the microprocessor controller 130 are based on received messages and measurements. The keyboard and display unit 131 enable an information exchange between the user and the base station.

Figure 3:
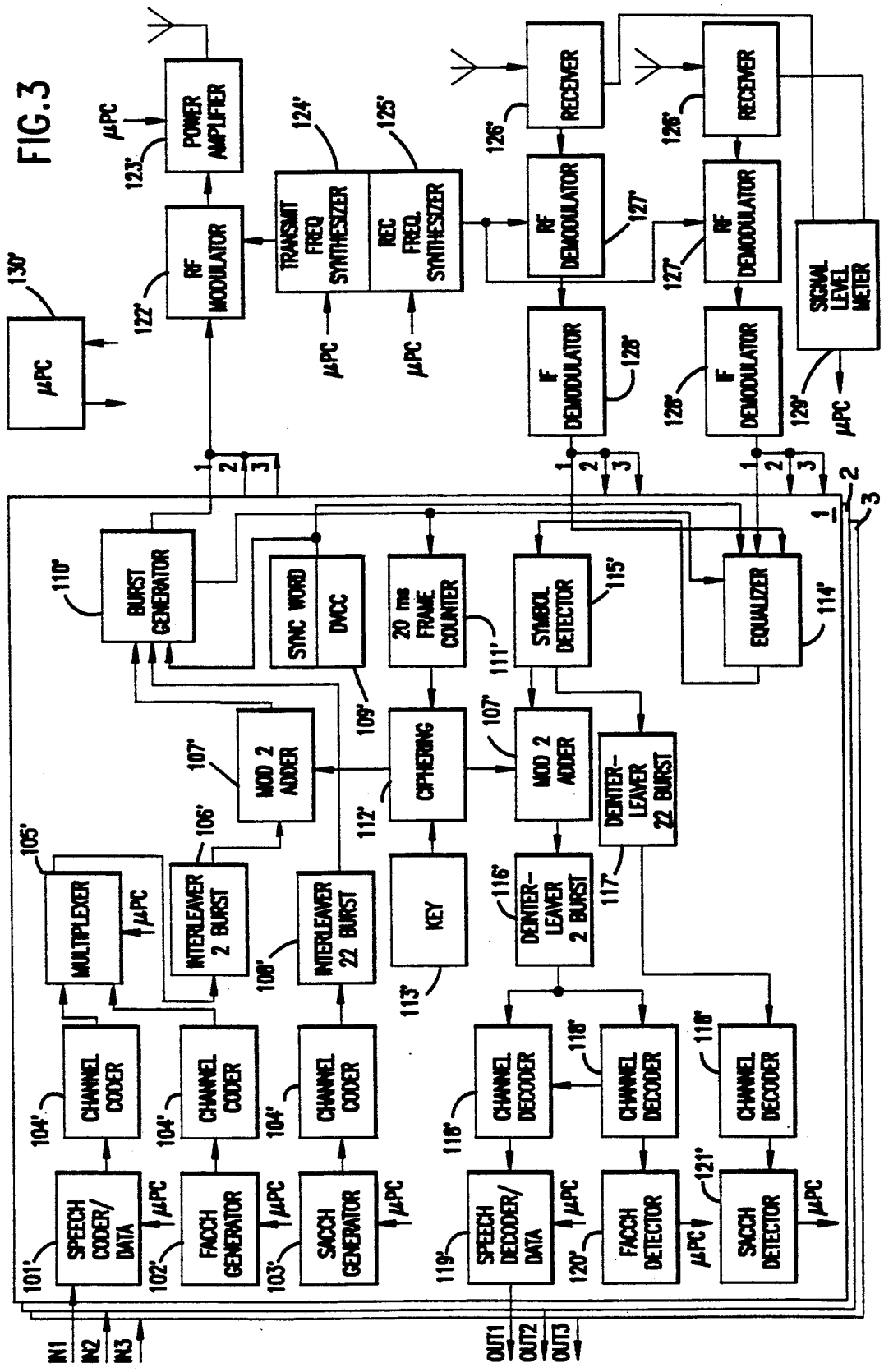
FIG. 3 is a function block diagram of a base station for implementing the present invention.

FIG. 3 illustrates a base station of a type that can operate in accordance with the present invention. The base station of the present invention incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station. Of course, the base station is designed for simultaneous communication with plural mobile stations in time multiplex. This is illustrated by three inputs, IN1, IN2 and IN3 at the left, and by three outputs OUT1, OUT2, and OUT 3 at the left. each input IN is connected to a unique speech coder, only one of which is illustrated. Each output OUT is connected to a unique speech decoder, only one of which is illustrated. The R.F. modulator is connected to a unique burst generator for each of three possible mobile stations. Only one of these generators is illustrated. Similarly, each I.F. demodulator is connected to a unique equalizer for each of three possible mobile stations. Only one of these equalizers is illustrated.

Figure 4:
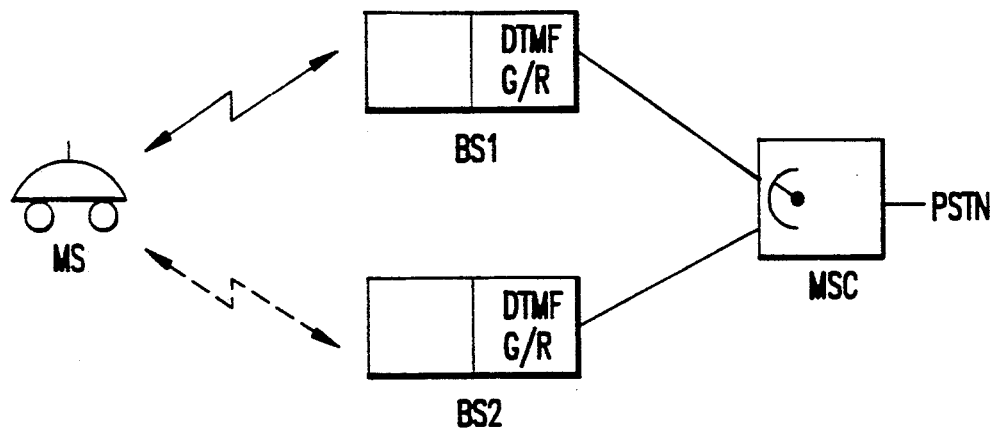
FIG. 4 is a simplified block diagram showing a handoff between two base stations.

In cellular mobile radio systems, it is fundamental that a mobile station with an established connection on a radio channel be able to maintain that connection when moving from one cell served by one base station to another cell served by another base station. The process by which a mobile station maintains an established connection when moving among cells is generally referred to as handoff. FIG. 4 shows a simplified diagram of a mobile station MS, currently served by a base station BS1, being handed off to another base station BS2. The base stations, according to FIG. 4, both have a DTMF generator/receiver (DTMF G/R), corresponding to the speech coder 101' and the speech decoder 119' in FIG. 3. The speech decoder 119' generates DTMF tones for the mobile switching center MSC in accordance with instructions from the microprocessor controller 130'. These DTMF tones are then transmitted by the MSC to the PSTN. The DTMF tones from the MSC are received by the speech coder 101' in accordance with instructions from the microprocessor controller 130'.

The base station BS1 in FIG. 4 receives over the FACCH channel a request from the mobile station MS to send DTMF tones from the base station BS1 to the MSC. The microprocessor controller 130' of the base station BS1 receives that request and instructs the speech decoder 119' to send the DTMF tones. The timing and sequence length of the DTMF tones are controlled by the microprocessor controller 130'. DTMF messages, rather than DTMF tones, are transmitted over the radio path between the base station BS and mobile station MS. Because the DTMF messages are not audio signals, the speech coder 101' and the speech decoder 119' can perform their respective tasks of coding or decoding DTMF tones to or from the mobile switching center MSC.

In general, cellular communication is possible only when the desired information carrying radio signals have a sufficient strength at the receiver. In addition, the desired information must be distinguishable from noise and interfering radio signals. The signal strength and quality meters 129, 129' perform cyclical sampling of the strength measurements of received radio frequencies. While all system frequencies may be sampled, only the voice channel frequencies allocated to the neighboring cells are of interest for handoff. In this way, each cell knows what the transmission strength would be using a neighboring cell's voice channel if that neighboring cell would take over the transmission.

If a handoff has been requested by a particular cell C, the mobile switching center MSC commands neighboring cells to send their respective measurement results of signal strength from the mobile station. Based on the signal strength results, the mobile switching center MSC determines the optimum target cell to handle the call to or from the mobile station in cell C. Various criteria for choosing the target cell may be used. However, the particular criteria used are not important to the implementation of the invention.

Once the mobile switching center MSC determines the target cell for switching the call through, the mobile switching center MSC selects and attempts to seize an idle voice channel in this particular cell. In FIG. 4, base station BS1 identifies the base station of the current cell and the base station BS2 identifies the base station of the target cell.

When a voice channel at the base station BS2 has been selected and seized, the mobile switching center MSC transmits an order to the base station BS2 to start the transmission on the selected voice channel using the proper DVCC (digital voice color code). A first group of radio frequencies is used in the cellular mobile radio system for transmission of radio signals from base stations to mobile stations. A second group of radio channels is used for transmission of radio signals from mobiles to base stations. Normally, each base station has at least one control channel for monitoring and controlling mobiles during set up of a connection, establishing and maintaining a connection, and handing off an established connection.

In digital cellular systems using TDMA (time division multiple access), the base station responsible for communication with a particular mobile station MS, transfers to the mobile station MS information regarding a particular radio channel and time slot identifier code to be used for communication. Each radio frequency assigned to a particular base station is divided into time slots with three time slots being grouped in a single frame, for example. In this way, multiple digital channels corresponding to the multiple time slots are generated on a common radio frequency using time division multiplex techniques.

Associated with each radio frequency in a particular cell is a DVCC code. The same DVCC code is used for all digital channels on a particular radio frequency in a particular cell. Thus, by specifying a particular frequency, a particular DVCC code, and a particular time slot identifier, a specific digital channel can be identified by the mobile and the base station. Preferably, the time slot identifier code according to the present invention may be used for synchronization of receiver to transmitter. The purpose of the DVCC code in cellular mobile radio systems is similar to that of the SAT (supervisory audio tone) in analog cellular systems. The DVCC code is transmitted in all the time slots used by the base station, received by the mobile station, and returned to the base station. Without proper transmission and reception of the DVCC code, a call is eventually terminated.

The basic signalling involved in a handoff will be described below. When a handoff order is delivered by the mobile switching center MSC to the base station BS1, the base station BS1 then sends a handoff order to the mobile station MS to tune to a new voice channel, time slot, and DVCC code on the base station BS2. At the same time, the base station BS1 sends a handoff synchronization signal to the mobile switching center MSC indicating that the handoff order has been sent to the mobile station MS. Upon receipt of the handoff order, the mobile station MS sends an acknowledge signal back to the base station BS1, tunes to the newly assigned voice channel and time slot, and transmits the new DVCC code signal with each message. At this point, handoff is effected. The base station BS2 then confirms the handoff with the mobile switching center MSC when the mobile station properly tunes to the assigned station at the base station BS2 and sends the correct DVCC associated with that channel to the base station BS2.

As described previously, a problem occurs when the handoff operation coincides with a DTMF tone transmission from the current base station, e.g., the base station BS1 to the mobile switching center MSC. In order to illustrate the signalling used in the present invention to solve this problem, reference is made to the signalling diagrams shown in FIGS. 4–6 as well as the function block diagrams of FIGS. 2–3.

Referring again to FIG. 2, DTMF digits/symbols keyed into a keyboard on a telephone handset (not shown) are input to the microprocessor 130. While DTMF signals are transmitted in land systems as audio type signals (each DTMF tone consisting of two sinusoidal components, one from a high group of three frequencies and one from a low group of four frequencies), the microprocessor 130 converts each keyed-in digit into a corresponding binary code. The binary codes are transmitted as DTMF messages over the FACCH channel to the base station. A total of 63 digits/symbols may be transmitted from the mobile station MS to a base station BS in one message. The message which requests the sending of digital DTMF information, either a send burst DTMF or a send continuous DTMF, is communicated on the FACCH channel. Likewise, acknowledgement signals for the sending of burst and continuous DTMF requests are returned on the FACCH channel.

The situation where a handoff request occurs when DTMF tones are being transmitted from a base station BS1 to the mobile switching center MSC will now be described in conjunction with FIGS. 4 and 5. FIG. 4 illustrates generally that the mobile station MS is being handed off from the base station BS1 to the base station BS2. During the handoff, DTMF tones are being generated in the base station BS1 in a DTMF generator/receiver (G/R) and transmitted to the mobile switching center MSC. Sending and receiving DTMF tones may be implemented in the speech decoder 119' and speech coder 101', respectively, as described above.

The timing diagrams in FIGS. 5(a)–5(d) illustrate the various control signals sent between the various microprocessors in the mobile station MS, the base station BS1, the base station BS2, and the mobile switching center MSC. FIG. 5(a) sets forth a number of signals which are common to each of the cases described in FIGS. 5(b)–5(d). Initially, a request to send a DTMF message is sent from the mobile station MS to the base station BS1. The base station BS1 receives the DTMF message in binary form, acknowledges the request, translates the binary information into DTMF tones, and transmits the DTMF tones to the mobile switching center MSC. Sometime during the transmission of the DTMF tones from the base station BS1 to the mobile switching center MSC, a handoff order is sent from the mobile switching center MSC to the base station BS1. The following three cases describe three preferred embodiments for handling handoff orders coinciding with DTMF tone transmissions.

FIG. 5(b) illustrates the signaling procedure that takes place after the base station BS1 receives a handoff order from the mobile switching center MSC while the base station BS1 is sending in the burst DTMF mode DTMF tones to the mobile switching center MSC. According to a preferred embodiment shown in FIG. 5(b), the base station BS1 requests (via the mobile switching center MSC) the target base station BS2 to take over the DTMF tone transmission to the mobile switching center MSC after the handoff occurs. After reaching the next pause in the DTMF burst sequence, the base station BS1 transfers the remaining DTMF digits to the base station BS2 via the mobile switching center MSC. The base station BS2 acknowledges receipt of the DTMF tone information to the base station BS1 via the mobile switching center MSC. The base station BS1 transmits a sync order to the mobile switching center MSC causing its group selector to switch the connection from the base station BS1 to the base station BS2.

The mobile switching center MSC is a telephone exchange in which a group selector generally refers to a hardware component provided after the so-called subscriber selector stage. That selector stage switches various subscribers on to and off of a single line connection. The group selector switches different line connections to the selector stage. At the same time the group selector switches the line connection, the base station BS1 transmits a handoff order to the mobile station MS. The mobile station MS acknowledges the handoff command, tunes to the base station BS2 channel selected by the mobile switching center MSC, and begins transmitting the DVCC associated with the base station BS2. Once the correct DVCC is received from the mobile station MS by the base station BS2, the base station BS2 then continues sending the remaining DTMF tone signals to the mobile switching center MSC.

Thus, in the burst mode, once the handoff order is issued from the mobile switching center MSC, the base station BS1 completes transmitting its current DTMF tones, detects the subsequent pause between bursts, and informs the base station BS2 to take over the DTMF generation. At that point, the base station BS2 delays generating the DTMF tone signals until the handoff has been satisfactorily accomplished. Accordingly, handoff-related disturbances do not affect the DTMF tone transmission.

FIG. 5(c) illustrates the signalling procedures that occur when a handoff order from the mobile switching center MSC to the base station BS1 occurs, while the base station BS1 sends DTMF tones to the mobile switching center MSC in a continuous format. In the continuous DTMF mode, there is no predetermined pause that can be detected after each DTMF tone. According to this embodiment of the present invention, the base station BS1 continues to transmit the DTMF tones. The base station BS1 also transmits, via the mobile switching center MSC, to the target base station BS2 those tones which are presently being transmitted from the base station BS1 and requests the target base station BS2 to start transmitting the DTMF tones. The target base station BS2 starts transmission of the remaining DTMF tones and sends an acknowledge signal back to the base station BS1. Accordingly, after handoff occurs, both base stations BS1 and BS2 will be transmitting the same DTMF tones to the mobile switching center MSC. Then the base station BS1 sends a sync order to the mobile switching center MSC indicating that the handoff can be performed at this point by switching the group selector GS from the base station BS to the base station BS2. The base station BS1 also sends a handoff order to the mobile station MS to tune to the selected channel on base station BS2.

The mobile station MS acknowledges the handoff order to the base station BS1. The base station BS1 ceases to transmit DTMF tones in the continuous mode after receiving the handoff acknowledgement from the mobile station MS. Transmission may cease after a delay required to transmit at least a minimum length of the DTMF tones and/or to allow for the establishing of communication between the mobile station MS and the base station BS2. After acknowledgement, the mobile station MS tunes to the frequency indicated in the handoff order and synchronizes to the base station BS2 and the time slot of the radio channel using the time slot identifier code and the DVCC indicated in the handoff order. The mobile station MS then starts transmitting messages which include the appropriate DVCC in the time slot of the radio frequency appropriate in the handoff order. The base station BS2 monitors that radio frequency in accordance with the handoff order for messages having the correct DVCC in the time slot in accordance with the handoff order. When such messages are received, the base station BS2 informs the MSC. The group selector is switched from a line connection to the base station BS1 to a line connection to the base station BS2. The mobile station MS informs the base station BS2 to transmit any other DTMF tones by sending DTMF messages to the base station BS2.

FIG. 5(d) shows an alternative version of the present invention where both the burst and continuous DTMF formats described in FIGS. 5(b) and 5(c), respectively, can be handled using a simplified signalling procedure. Reconsidering the case of handing off just after the mobile station MS has sent to the base station BS1 a request to send DTMF signals, the base station BS1 continues ongoing DTMF transmission but delays forwarding the handoff order to the mobile station MS for a predetermined time delay so that in many cases the entire DTMF tone transmission is completed. In the burst DTMF situation, the delay period is readily fixed, corresponding to several DTMF pulses and intermediate pause pulses. In the case of continuous DTMF, the base station BS1 delays handoff for a time required to transmit at least the minimum length of the presently transmitted DTMF tones. In other words, handoff is delayed for a time period sufficient to ensure that in many cases the DTMF transmissions in either mode have been completed. At the end of this delay period, the base station BS1 then sends a sync order to the mobile switching center MSC indicating that the group selector GS may now perform switching from the base station BS1 to the base station BS2. The base station BS1 also sends a handoff order to the mobile station MS to tune to a selected channel on base station BS2.

The base station BS2 monitors the radio frequency specified in the handoff order for bursts having the correct DVCC in the time slot specified in the handoff order. When such bursts are received, the base station BS2 informs the MSC. At that point, the group selector is switched from a line connected to the base station BS1 to a line connected the base station to BS2.

This simplified version of the present invention is advantageous because the signalling between the base stations BS and the mobile switching center MSC is reduced. The base station BS1 simply waits a predetermined time period so that typical DTMF transmissions can be completed before proceeding with the handoff. A tradeoff of this embodiment is that unusually long burst or continuous DTMF signals may be cut off prematurely.

Figure 6:
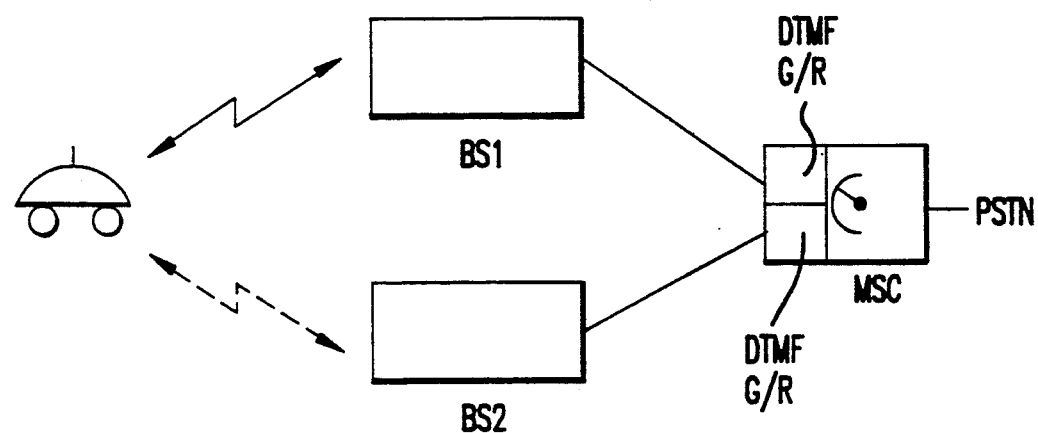
FIG. 6 is an alternative simplified block diagram of a handoff between two base stations.

FIG. 6 illustrates an alternative embodiment where the DTMF generator/receiver is implemented in the mobile switching center MSC in order to save transmission costs. In this situation, use of a lower bit rate between the base stations and the mobile switching center MSC results in lower transmission costs. Nevertheless, the principles set forth with regard to FIG. 4 apply equally as well to the embodiment illustrated in FIG. 6.

Figures 7A, 7B:
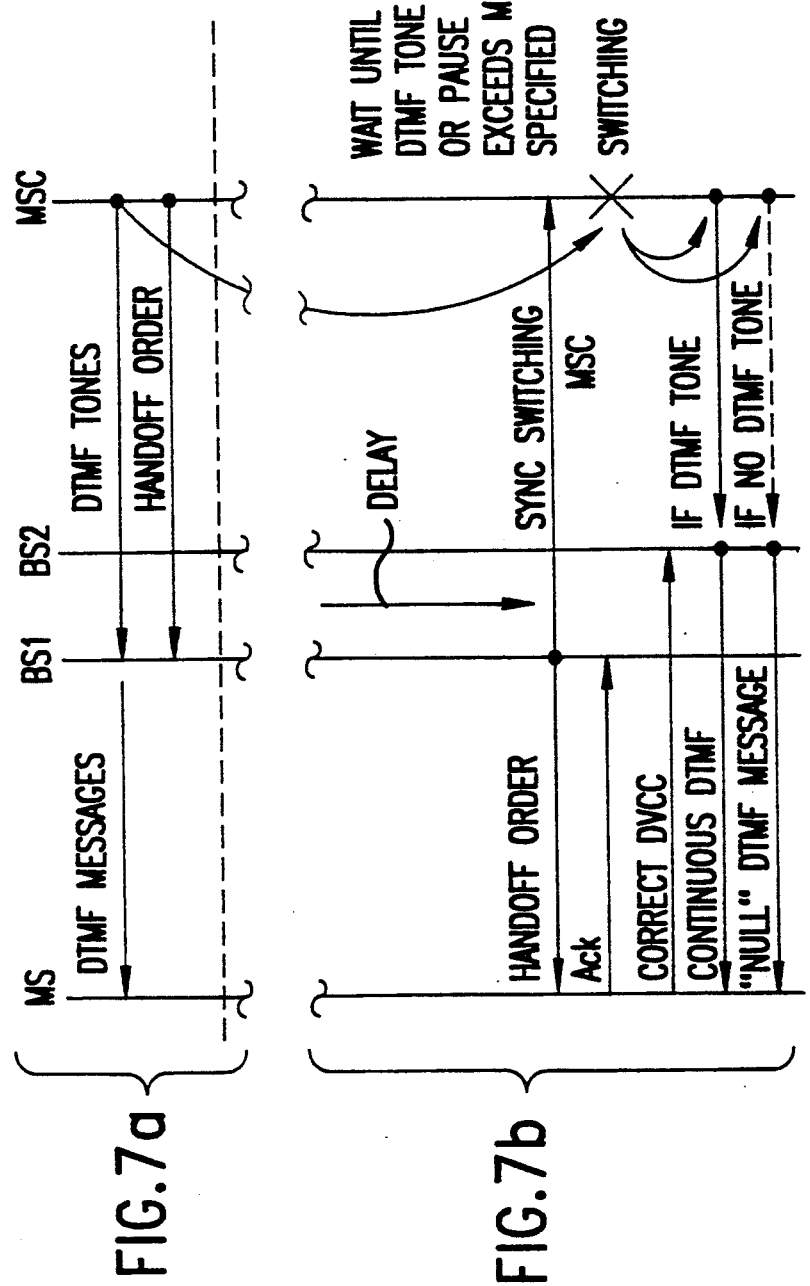
FIG. 7a and 7b illustrate a signal sequence diagram for a handoff during DTMF transmission from a mobile switching center MSC to a base station.

FIG. 7 illustrates a situation where DTMF tones are sent from the land system via the mobile switching center MSC to the mobile station MS. FIG. 7(a), in particular, illustrates the situation considered by the present invention where handoff occurs while DTMF tones are being sent from the mobile switching center MSC to the base station BS1. To avoid having a handoff divide DTMF tone transmission from the MSC to BS1 and BS2 into two portions shorter than the minimum time allowed by applicable DTMF receiver standards, a delay is introduced. This delay allows a dual tone or pause to continue until it can be recognized as a dual tone or a pause by the DTMF receiver, in the base station BS1. The delay can be defined as a remaining portion of the DTMF receiver decision time. In order to determine this delay time, the DTMF receiver, corresponding to speech codes 101', includes two detectors, one with a short decision time, e.g., 5 msec, and one with a standard decision time, e.g., 60 msec. After this delay, the base station BS1 transmits a handoff order to the mobile station MS and a synchronizing signal to the mobile switching center MSC indicating that switching from base station BS1 to base station BS2 may now take place in the group selector GS in the mobile switching center MSC. After the handoff, the base station BS2 may or may not immediately receive a dual DTMF tone, depending upon whether the DTMF tone transmissions were completed before switching. If a DTMF tone is received by BS2, indicating that the DTMF transmission was interrupted, as would be the case if continuous DTMF signals were to be transmitted to the mobile station MS, the base station BS2 transmits a "send continuous DTMF" signal to the mobile station MS. Alternatively, if no DTMF tones are received from the mobile switching center MSC, indicating that the DTMF transmission was completed, the base station BS2 sends a "null" DTMF message to the mobile station MS. The latter situation occurs when the handoff request is ordered late in the DTMF tone transmission. Consequently, after the time delay period, all the DTMF tones have been transmitted.

The program flow followed by the overall system and by each individual microprocessor in the mobile station, base stations, and the mobile switching center MSC will now be described in conjunction with FIGS. 8-13. One of the preferred embodiments of the overall system flow is disclosed in FIG. 8. In block 300, the base station BS1 initiates DTMF tone transmissions to the mobile switching center MSC. In block 302, a handoff is ordered which results in halting the DTMF tone transmission and transferring the remaining DTMF data to the base station BS2 for storage in block 304. Flow proceeds to block 306 where the mobile station MS is handed off from the base station BS1 to the base station BS2. Once the handoff has been completed, the remainder of the DTMF signals stored in the base station BS2 can be transmitted to the mobile switching center MSC as indicated in block 308.

Figure 9:
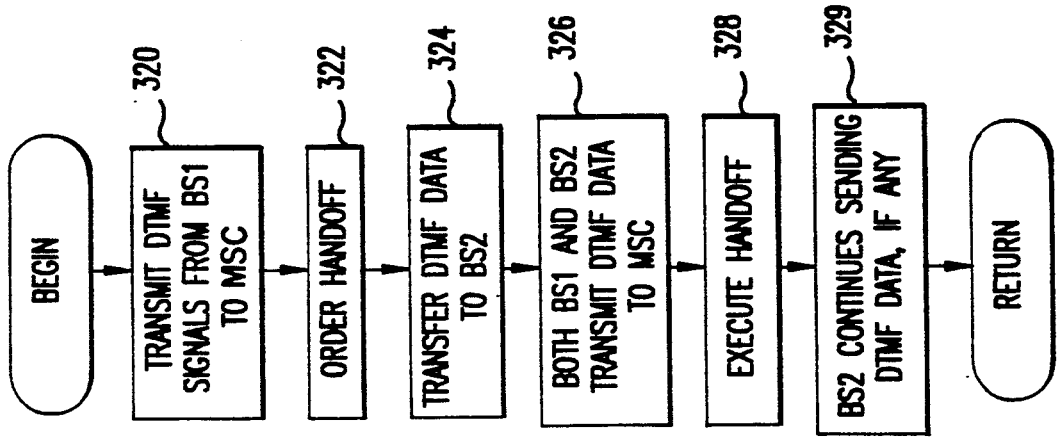
Figure 8:
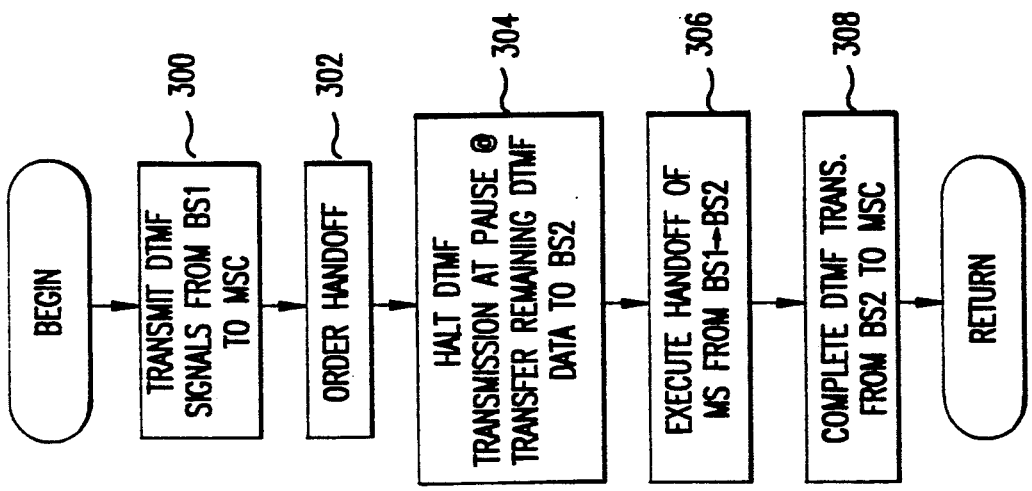

An alternative preferred embodiment of overall system operation is shown in FIG. 9. In block 320, the base station BS1 transmits DTMF signals to the mobile switching center MSC during which time a handoff is ordered in block 322. As opposed to the delaying of the DTMF transmissions as described with regard to FIG. 8, the DTMF data is transferred to the base station BS2 via the MSC in step 324. As indicated in block 326, both of the base stations BS1 and BS2 transmit the same DTMF tones to the MSC. In block 329, the base station BS2 continues transmitting any remaining DTMF tones to the MSC once the handoff is completed.

Figure 10:
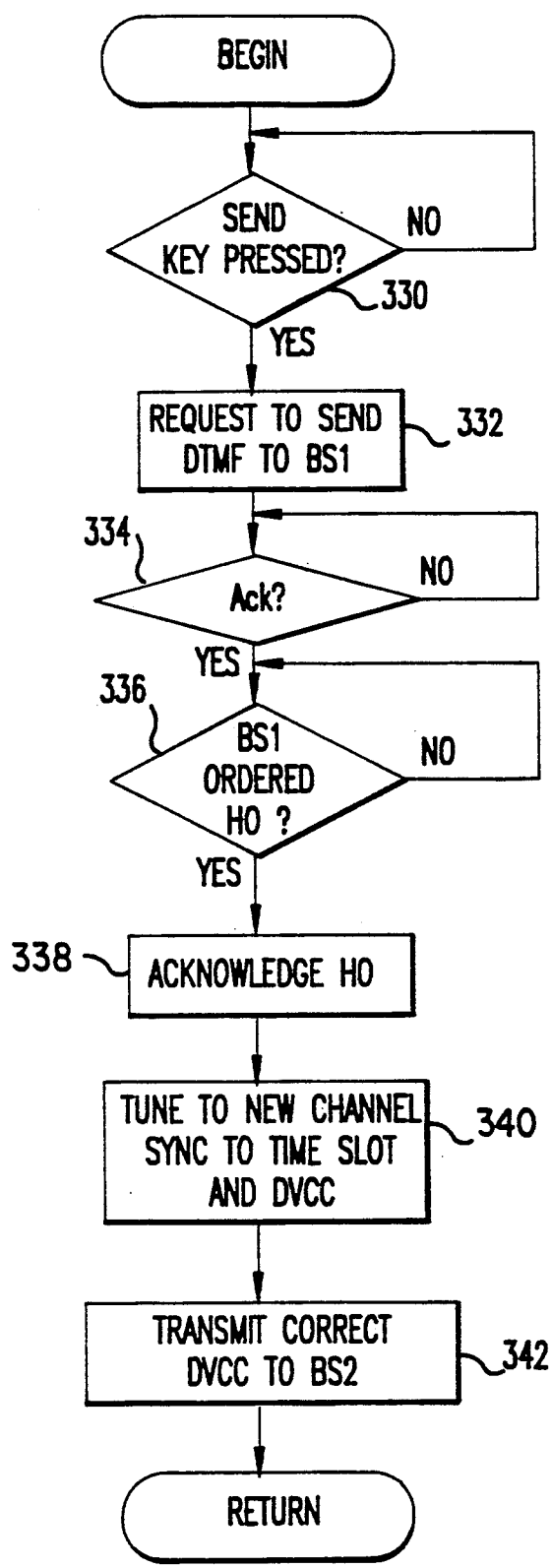

The program flow typically carried out by the mobile station in the various preferred embodiments is depicted in FIG. 10. At decision block 330, it is determined whether or not a user has pressed the send key on the telephone handset. Once the send key is detected, a request to send DTMF is transmitted to the base station BS1 in block 332. At block 334, the mobile station waits for the base station BS1 to acknowledge its request. At the next decision block 336, the mobile station determines whether or not the base station BS1 has ordered a handoff. If so, the handoff is acknowledged by the mobile in block 338. At block 340, the mobile tunes to the new RF frequency channel indicated in the handoff order and synchronizes to the base station BS2 using the time slot identifier code and the DVCC indicated in the handoff order. Once tuned to this channel, the mobile station MS transmits messages to the base station BS2 using the correct DVCC to indicate that a proper handoff has taken place in block 342.

Figure 11:
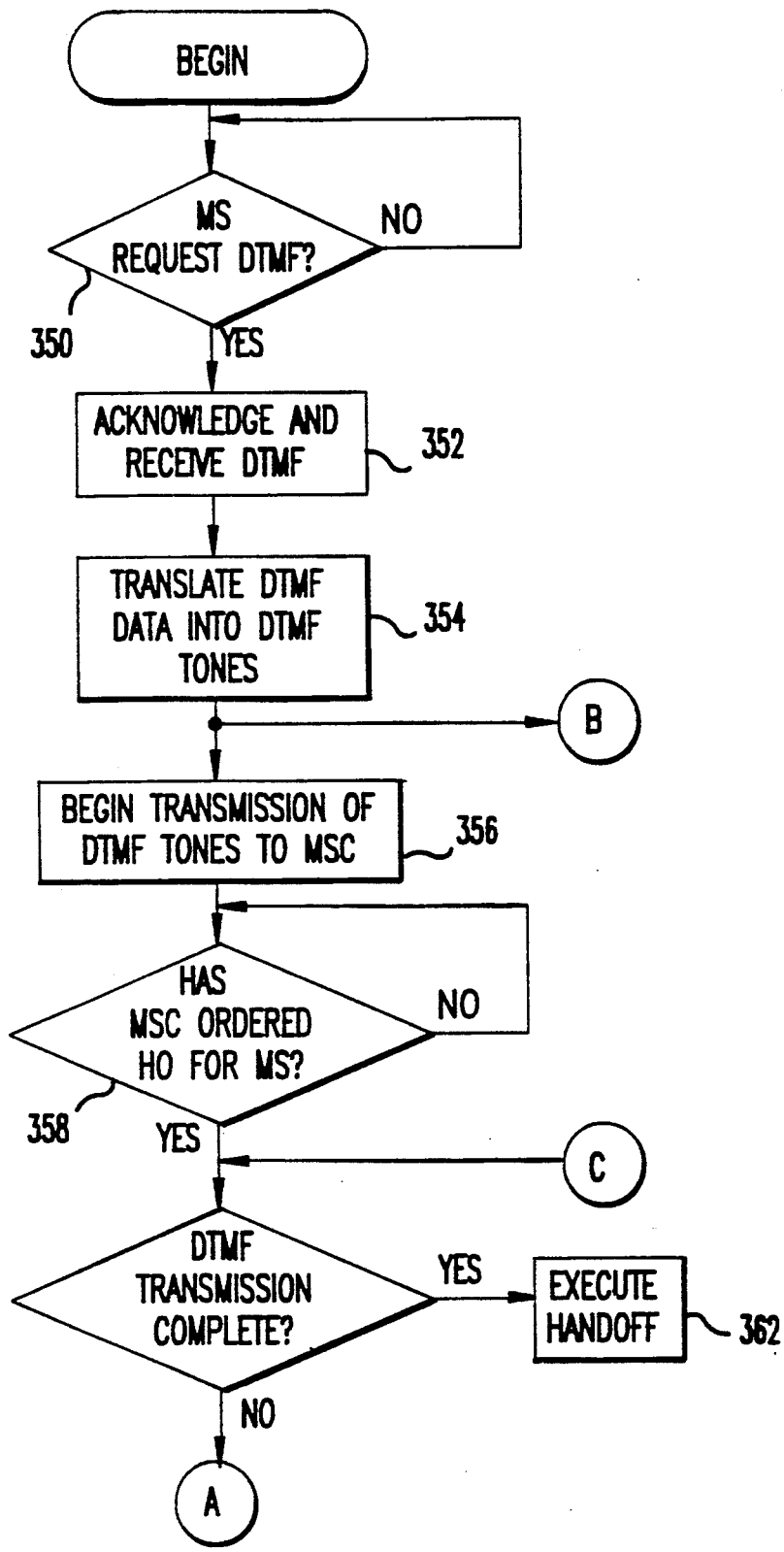
Figure 12:
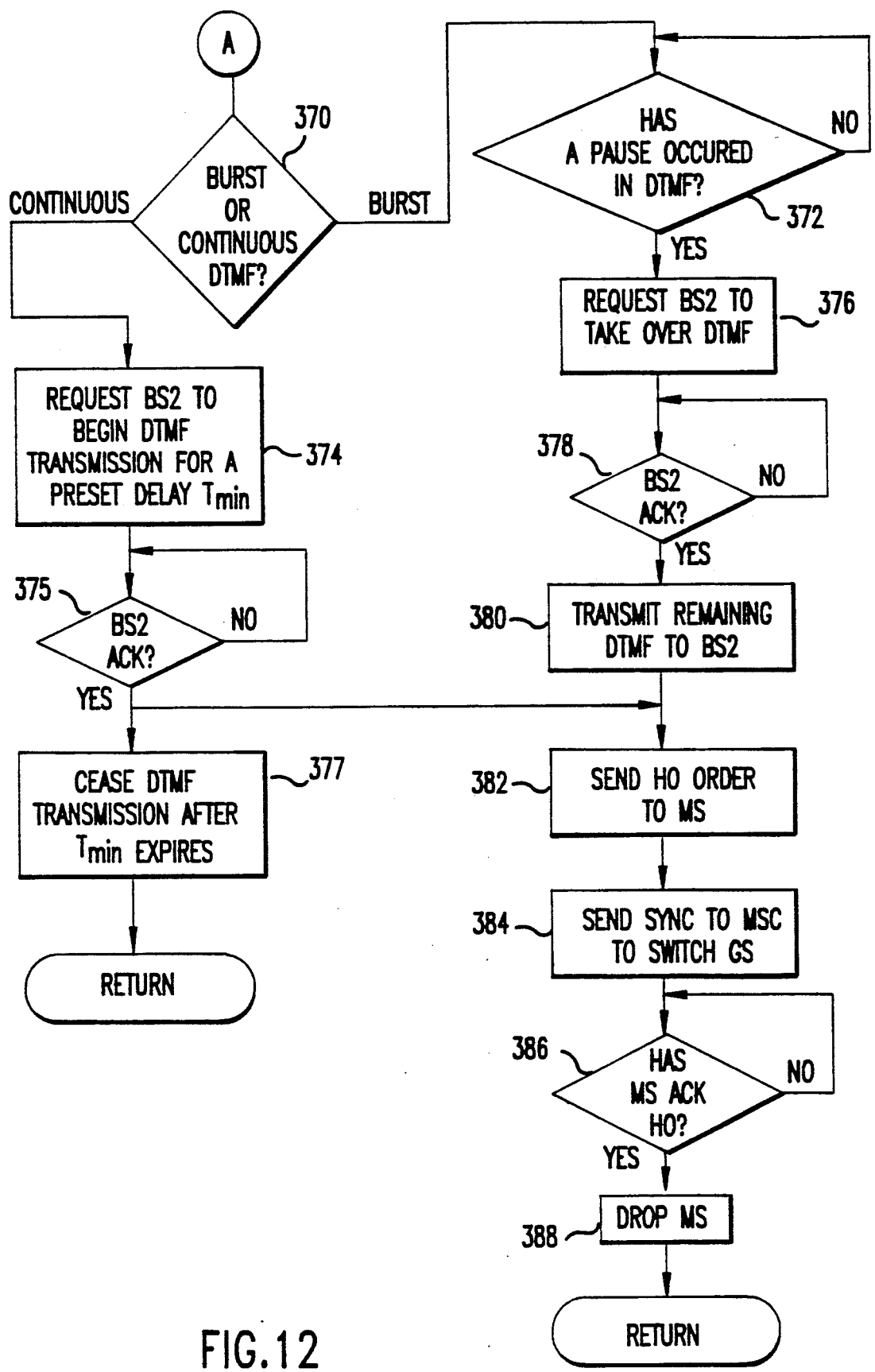

The program control followed by the base station BS1 in FIGS. 5(b)-5(c) is described with regard to FIG. 11. In decision block 350, the base station BS1 monitors the mobile station MS to determine whether or not a request to send DTMF has been made. If so, the base station BS1 acknowledges this request in block 352 and receives the DTMF information from the mobile station MS in binary form. Control then flows to block 354 where the binary DTMF information is translated into DTMF tones for transmission to the mobile switching center MSC, as depicted in block 356. During the transmission of these DTMF tones, the base station BS1 determines whether or not the mobile switching center MSC has ordered a handoff for the mobile station MS in decision block 358. If a handoff has been ordered, the base station BS1 determines whether or not the DTMF tone transmission has been completed in block 360. If the transmission has been completed, the handoff is freely executed in block 362.

Figure 13:
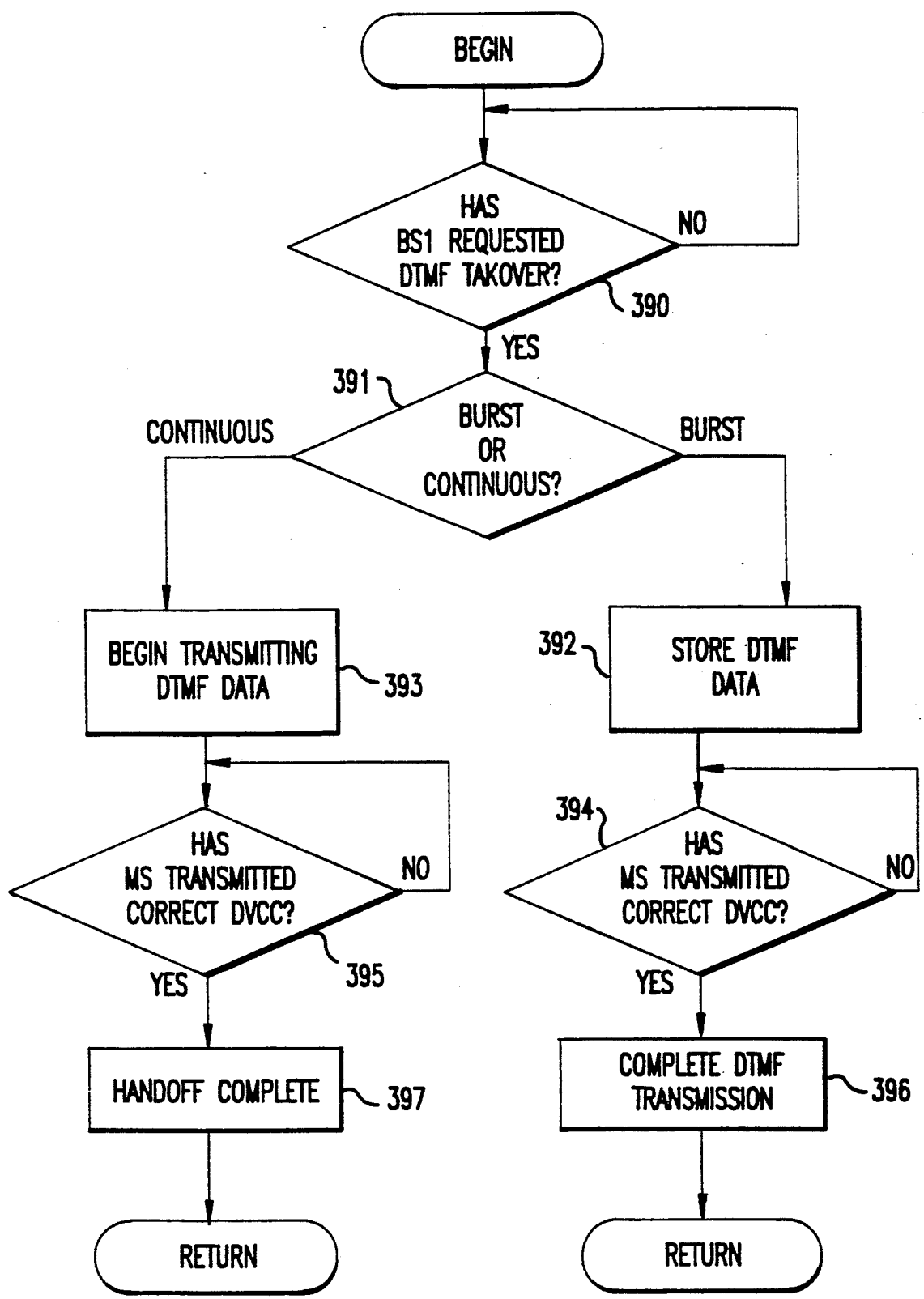

On the other hand, if the DTMF transmission has not been completed, program flow proceeds to FIG. 13 to determine whether the DTMF transmission is in burst or continuous mode at decision block 370. If in the burst DTMF mode, flow proceeds to decision block 372 to determine whether or not a pause has occurred in the DTMF transmission. Flow proceeds to block 376 only after a pause has occurred in the DTMF transmission. At block 376, the base station BS1 requests the base station BS2 via the mobile switching center MSC to take over the DTMF transmission. At decision block 378, it is determined whether the base station BS2 has acknowledged the request to take over DTMF tone transmission. Once acknowledged, the remaining DTMF information is transmitted from the base station BS1 to the base station BS2 as indicated in block 380. Referring back to decision block 370, if the DTMF transmission is in the continuous mode, flow proceeds to block 374 where the base station BS1 requests the base station BS2 to also transmit DTMF tones to the mobile switching center MSC for a predetermined time delay, Tmin. Once the base station BS2 acknowledges the request in decision block 375, both of the base stations BS1 and BS2 transmit in parallel the DTMF tones to the MSC. However, once Tmin expires, the base station BS1 ceases DTMF tone transmission in block 377. Also, after the base station BS2 acknowledges the request to begin DTMF transmission in the block 375 and after the remaining DTMF information has been transferred to the base station BS2 in the block 380, both flow branches proceed to block 382 where the base station BS1 sends the handoff order to the mobile station MS. At block 384, the base station BS1 sends a sync signal to the mobile switching center MSC to switch the group selector from the base station BS1 to the base station BS2. Once the base station BS1 receives a handoff acknowledgement from the mobile station MS in block 386, it ceases communications with the mobile station MS as indicated in block 388.

FIG. 13 depicts the program flow control of the base station BS2 in FIGS. 5(b)–5(c). In decision block 390, the base station BS2 determines whether the base station BS1 has requested a DTMF takeover. If it has, flow proceeds to decision block 391 to determine whether the DTMF tones are being transmitted in a burst or continuous mode. If in the burst mode, the base station BS2 stores DTMF information received from the base station BS1 in block 392. At block 394, the base station BS2 waits to receive a correct DVCC from the mobile station MS indicating that the handoff from the base station BS1 to the base station BS2 has been successfully completed. Once the base station BS2 receives the correct DVCC, the base station BS2 completes the DTMF transmission to the mobile switching center MSC as shown in block 396. If in the continuous mode, the base station BS2 begins transmitting DTMF tones to the MSC in block 393. At decision block 395, the base station BS2 waits to receive a correct DVCC from the mobile station MS. Once the correct DVCC is received, the handoff is complete as indicated in block 397.

Figure 14:
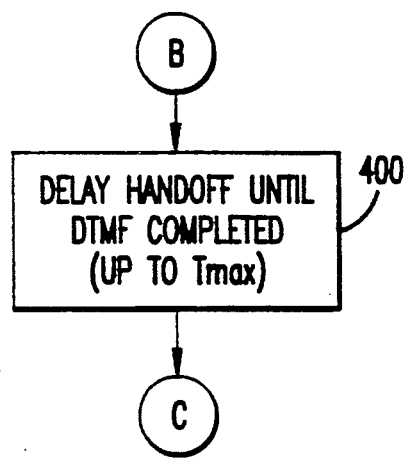
FIGS. 8-17 are flow diagrams depicting the flow of program control according to the present invention.

The alternative embodiment shown in FIG. 5(d) having a simplified signalling format for both burst and continuous DTMF modes is illustrated in flow diagram format in FIGS. 11 and 14. After the DTMF information has been translated into DTMF tones as indicated in block 354 in FIG. 11, flow moves through flag B to block 400 in FIG. 14 where handoff is delayed until, in most cases, the DTMF transmission is completed. In this embodiment, a predetermined time delay period, labeled Tmax, enables the DTMF tone transmission to the mobile switching center MSC to be completed. Flow control then returns to decision block 360 through flag C. Since the DTMF transmission is complete in this situation, the handoff can be executed as indicated in block 362.

Figure 15:
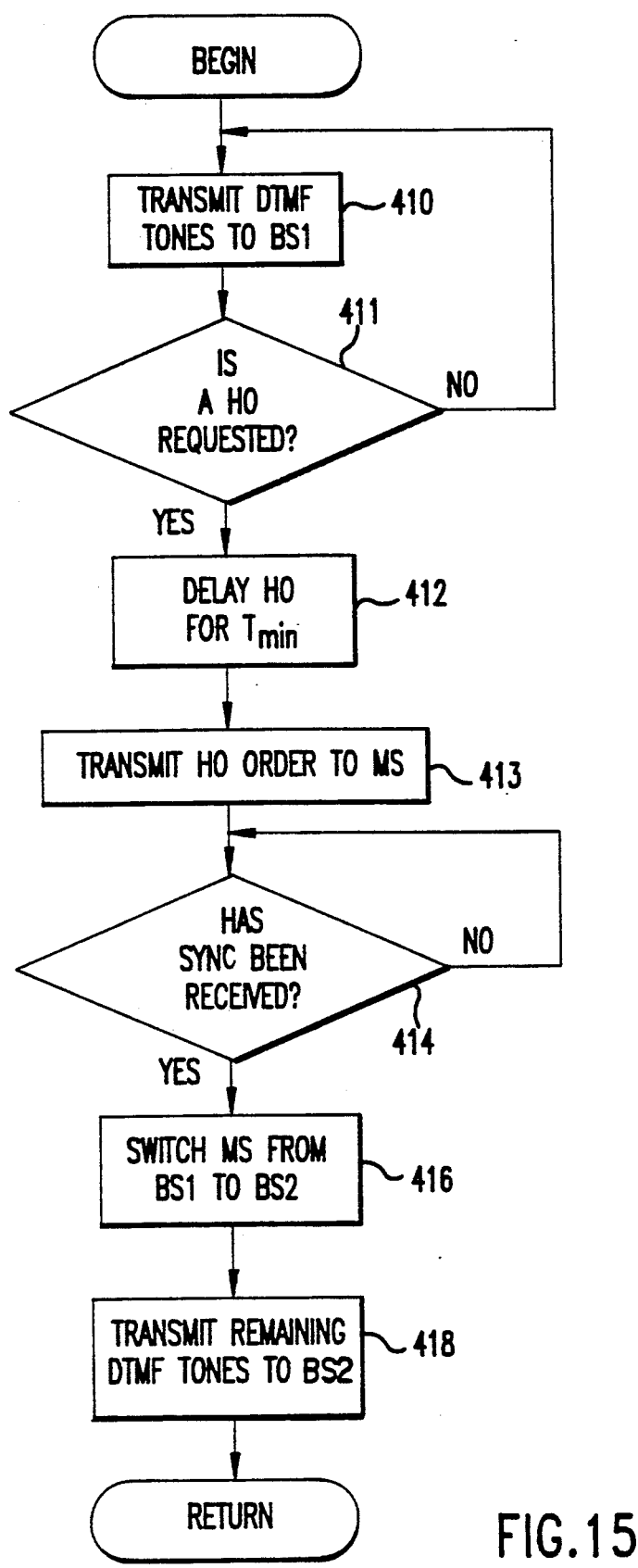
Figure 16:
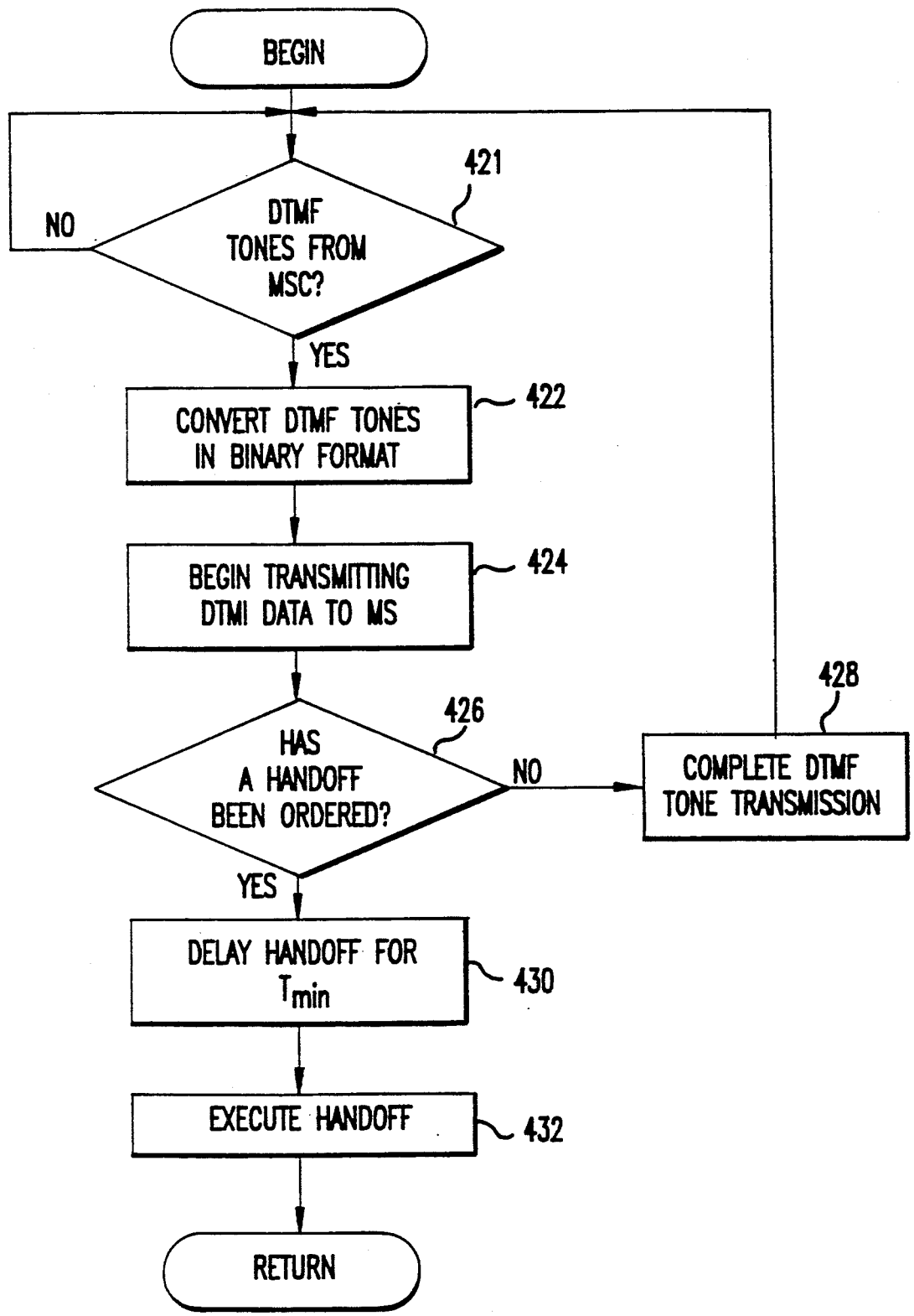

The program flow for the signalling procedures followed during DTMF transmissions from the mobile switching center MSC to the base station BS1 is set forth in FIGS. 15 and 16. In block 410, DTMF tones are transmitted from the mobile switching center MSC to the base station BS1 for subsequent translation into binary format in order to identify the called mobile station MS. Flow proceeds to decision block 411 to determine if a handoff request has been made. If the handoff has been requested, flow proceeds to function block 412 where the handoff is delayed for a predetermined time period, Tmin. After the delay expires a handoff order is sent in block 413 to the base station BS1 to handoff the mobile station to the base station BS2 before all of the DTMF tones are transmitted to the base station BS1. When a sync signal is received by the mobile switching center MSC from the base station BS1, the handoff is executed by switching control of the mobile station MS from the base station BS1 to the base station BS2 as indicated in blocks 414 and 416. In block 418, any remaining DTMF tones are transmitted to the base station BS2.

The program flow of the controller in the base station BS1 is depicted in FIG. 16. If DTMF tones are received from the mobile switching center MSC as shown in block 421, the base station BS1 begins conversion of the DTMF tones into binary format as indicated in block 422. Flow proceeds to block 424, where the base station BS1 begins transmitting DTMF call data to mobile station MS. If no handoff is ordered during the transmission of DTMF tones from the mobile switching center MSC to the base station BS1 as determined in decision block 426, DTMF tone transmission is completed in block 428. Otherwise, handoff is delayed for a delay period, Tmin, as shown in block 430, in order to complete DTMF tone transmission. After the delay period, control proceeds to block 432 where the handoff is executed.

Figure 17:
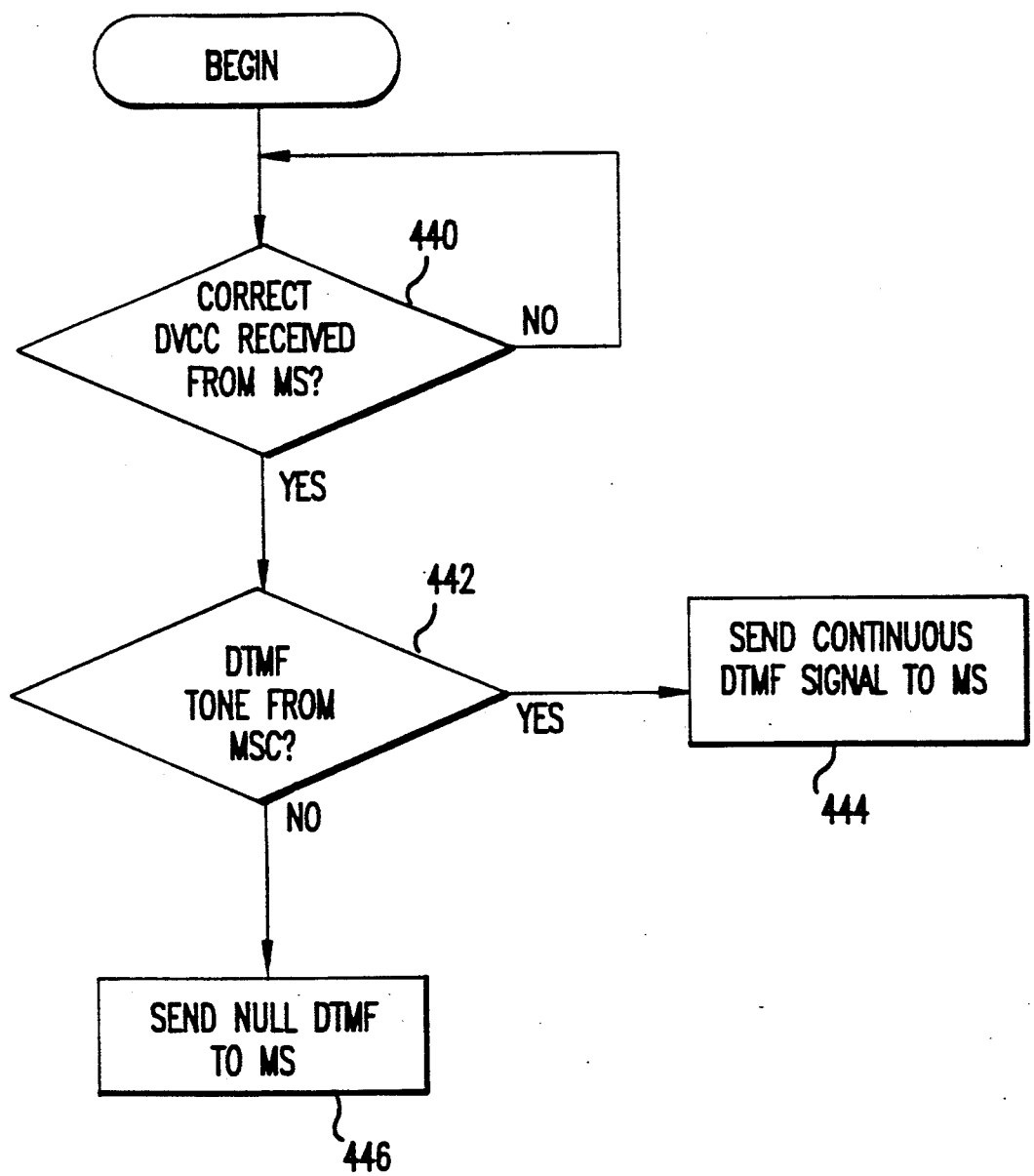

The program control followed by the controller in the base station BS2 is shown in FIG. 17. Once it is determined that a correct DVCC has been received from the mobile station MS in decision block 440, control proceeds to decision block 442. If a DTMF tone is received from the mobile switching center MSC, a continuous DTMF signal is sent to the mobile station MS as shown in block 440. Otherwise, a "null" DTMF signal is sent to the mobile station MS as depicted in block 446.

It will be appreciated by those of ordinary skill in the art that the present invention can be embodied in other specific forms without departing from the spirit or essential characteristics thereof. The presently disclosed embodiments are therefore considered in all respects to be illustrative and non-restrictive. The scope of the invention is indicated by appended claims, rather than the foregoing description, and all changes that come with the means and range of equivalence thereof are intended to be embraced therein.

What is claimed is:

1. A cellular mobile radiotelephone communication system, comprising:
    mobile radiotelephone means for sending DTMF messages over an air interface;
    first and second base station means for converting the DTMF messages into DTMF tones and transmitting the DTMF tones;
    switching controller means, connected to the first and second base station means, including means for receiving the DTMF tones and means for ordering a handoff of the mobile means from the first base station to the second base station, wherein some DTMF tones remain untransmitted;
    means for transferring untransmitted DTMF information from the first base station to the second base station sot hat both the first and second base stations transmit the untransmitted DTMF tones to the mobile station for a predetermined time; and
    means for terminating transmission of the untransmitted DTMF tones from the first base station after the predetermined time expires.

2. A method for minimizing disturbances to DTMF signalling during a handoff in a cellular mobile radio system, comprising:
    (a) transmitting a DTMF request from a mobile station to a first base station;
    (b) transmitting DTMF tones from said first base station to a switching center;
    (c) ordering a handoff of said mobile station to a second base station;
    (d) delaying execution of the handoff for a predetermined time period to complete transmission of DTMF tones from said first base station to said switching center; and
    (e) executing said handoff.

3. A cellular mobile radiotelephone communication system, comprising:
    mobile radiotelephone means for sending DTMF messages over an air interface;

first and second base station means for converting the DTMF messages into DTMF tones and transmitting the DTMF tones;

switching controller means, connected to the first and second base station means, including means for receiving the DTMF tones and means for ordering a handoff of the mobile means from the first base station to the second base station; and means for delaying the handoff until the transmission of DTMF tones to the switching controller means is completed.

4. The cellular system as described in claim 3, wherein said first and second base stations each include: means for receiving and generating DTMF tones.

5. A cellular mobile radiotelephone communication system, comprising:

mobile radiotelephone means for sending DTMF messages over an air interface;

first and second base station means for converting the DTMF messages into DTMF tones and transmitting the DTMF tones;

switching controller means, connected to the first and second base station means, including means for receiving the DTMF tones and means for ordering a handoff of the mobile means from the first base station to the second base station;

means for interrupting transmission of the DTMF tones from the first base station when a handoff occurs;

means for continuing DTMF tone transmission from the second base station after handoff completion; and wherein the means for interrupting includes:

means for transferring untransmitted DTMF tones from the first base station to the second base station.

6. The cellular system as described in claim 5, wherein the DTMF tones are transmitted in a burst DTMF mode and the means for interrupting interrupts transmission of DTMF tones after detecting a pause and in the continuous mode a means for interrupting interrupts transmission of DTMF tones after a predetermined time delay.

7. A cellular mobile radiotelephone communication system, comprising:

mobile radiotelephone means for sending DTMF messages over an air interface;

first and second base station means for converting the DTMF messages into DTMF tones and transmitting the DTMF tones;

switching controller means, connected to the first and second base station means, including means for receiving the DTMF tones and means for ordering a handoff of the mobile means from the first base station to the second base station; and means for delaying the start of the transmission of DTMF tones for a predetermined time delay.

8. The cellular system as described in claim 7, wherein the time delay exceeds a time period associated with executing the handoff.

9. The cellular system as described in claim 8, wherein the DTMF tone transmission begins after the delay period expires.

10. A cellular mobile radiotelephone communication system, comprising:

switching controller means for transmitting DTMF tone signals to a first base station;

means for requesting a handoff of a mobile radiotelephone from the first base station to a second base station during the DTMF tone transmission;

means for delaying the handoff for a predetermined time period; and means for continuing the DTMF tone transmission after the handoff is completed.

11. The cellular system as described in claim 10, wherein said switching controller means includes: means for receiving and generating DTMF tones.

12. The cellular system as described in claim 10, wherein the second base station transmits after the predetermined time period has expired either a continuous DTMF message to the mobile radiotelephone if additional DTMF tones are being transmitted by the switching controller means or a null DTMF message if no additional DTMF tones are being transmitted by the switching controller means.

13. A method for minimizing disturbances to DTMF signalling during a handoff operation in a cellular mobile radio system, comprising:

(a) transmitting a DTMF request from a mobile station to a first base station;

(b) transmitting DTMF tones from said first base station to a switching center;

(c) ordering a handoff of said mobile station to a second base station;

(d) detecting a pause in said DTMF transmission;

(e) temporarily halting DTMF tone transmission;

(f) transferring DTMF tone data remaining for transmission to said second base station;

(g) executing handoff of said mobile station from said first base station to said second base station; and (h) transmitting said remaining DTMF tones from said second base station to said switching center.

14. The method defined in claim 13, wherein said DTMF tones are transmitted in a burst format.

15. The method defined in claim 13, wherein said step of transmitting said remaining DTMF tones begins immediately after the mobile station transmits a digital code associated with said second base station.

16. A method for minimizing disturbances to DTMF signalling during a handoff operation in a cellular mobile radio system, comprising:

(a) transmitting a DTMF request from a mobile station to a first base station;

(b) beginning to transmit DTMF tones from said first base station to a switching center;

(c) ordering a handoff of said mobile station to a second base station at a time when some DTMF tones remain untransmitted;

(d) transferring untransmitted DTMF information for transmission to said second base station;

(e) continuing DTMF transmission from both said first and second base station for a predetermined time period after the handoff order; and (f) executing the handoff of said mobile station from said first base station to said second base station.

17. The method as defined in claim 16, wherein said DTMF tones are transmitted in a continuous format.

18. A method for minimizing disturbances to DTMF signalling during a handoff operation in a cellular mobile radio system, comprising:

(a) transmitting DTMF tones from a switching center to a first base station;

(b) transmitting DTMF messages from said first base station to a mobile station;

(c) ordering a handoff of said mobile station to a second base station;
(d) delaying execution of the handoff for a predetermined time period;
(e) halting said DTMF transmission after said time period expires;
(f) executing handoff of said mobile station to said second base station; and
(g) continuing transmission of DTMF tones from said switching center to said second base station.

19. The method as defined in claim 18, further comprising:
(h) transmitting a first signal from said second base station to said mobile station if DTMF tones are received by said second base station from said switching center; and
(i) transmitting a second signal from said second base station to said mobile station if no DTMF tones are received by said second base station from said switching center.

* * * * *